(12) United States Patent
Tseng et al.

(10) Patent No.: US 11,807,524 B2
(45) Date of Patent: Nov. 7, 2023

(54) CARBON NANOMATERIAL FOR GAS STORAGE AND METHOD FOR MANUFACTURING THE SAME

(71) Applicant: National Tsing Hua University, Hsinchu (TW)

(72) Inventors: Fan-Gang Tseng, Hsinchu (TW); Kuang-Hao Lo, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 65 days.

(21) Appl. No.: 17/700,518

(22) Filed: Mar. 22, 2022

(65) Prior Publication Data

US 2023/0192481 A1     Jun. 22, 2023

(30) Foreign Application Priority Data

Dec. 20, 2021 (TW) ................... 110147671

(51) Int. Cl.
*C01B 3/00* (2006.01)
*B82Y 30/00* (2011.01)
*B82Y 40/00* (2011.01)

(52) U.S. Cl.
CPC ............ *C01B 3/0021* (2013.01); *B82Y 30/00* (2013.01); *B82Y 40/00* (2013.01); *C01P 2002/82* (2013.01); *C01P 2006/12* (2013.01); *C01P 2006/14* (2013.01); *C01P 2006/16* (2013.01)

(58) Field of Classification Search
CPC ....... C01B 3/0021; B82Y 30/00; B82Y 40/00; C01P 2002/82; C01P 2006/12; C01P 2006/14; C01P 2006/16; Y02E 60/32
See application file for complete search history.

(56) References Cited

U.S. PATENT DOCUMENTS

2017/0140881 A1\* 5/2017 Mitlin ..................... C01B 32/30

FOREIGN PATENT DOCUMENTS

| CN | 104709906 | 6/2015 |
|----|-----------|--------|
| CN | 108423678 | 8/2018 |
| CN | 109179414 | 1/2019 |
| CN | 109663569 | 4/2019 |
| CN | 110272034 | 9/2019 |

(Continued)

OTHER PUBLICATIONS

M. Jorda'-Beneyto et al., "Hydrogen storage on chemically activated carbons and carbon nanomaterials at high pressures", Carbon, vol. 45, Nov. 2006, pp. 293-303.

(Continued)

*Primary Examiner* — Daniel C. McCracken
(74) *Attorney, Agent, or Firm* — JCIPRNET

(57) ABSTRACT

A carbon nanomaterial for gas storage and a method for manufacturing the same are provided. The specific surface area of the carbon nanomaterial for gas storage is greater than 2000 m2/g. The mesopore volume of the carbon nanomaterial for gas storage is greater than the micropore volume of the carbon nanomaterial for gas storage, and the carbon nanomaterial for gas storage has a peak intensity ratio (ID/IG) between G band and D band, as determined from the Raman spectrum, between 1.1 and 2. In the carbon nanomaterial for gas storage, the pore volume of pores with a pore width of 6 nm or less is bigger than that of pores with a pore width greater than 6 nm.

20 Claims, 7 Drawing Sheets

(56) References Cited

FOREIGN PATENT DOCUMENTS

CN 113518660 10/2021
TW 202010709 3/2020

OTHER PUBLICATIONS

Chia-Hung Hsu, "Preparation of Activated Carbon From Hydrothermal Carbonization of Sucrose Activated by Potassium Hydroxide and Its Properties", Thesis of Master Degree, NCU, Jun. 2009, pp. 1-77.
"Office Action of Taiwan Counterpart Application", dated Jul. 21, 2022, p. 1-p. 5.

* cited by examiner

US 11,807,524 B2

CARBON NANOMATERIAL FOR GAS STORAGE AND METHOD FOR MANUFACTURING THE SAME

CROSS-REFERENCE TO RELATED APPLICATION

This application claims the priority benefit of Taiwan application serial no. 110147671, filed on Dec. 20, 2021. The entirety of the above-mentioned patent application is hereby incorporated by reference herein and made a part of this specification.

BACKGROUND

Technical Field

The disclosure relates to a carbon nanomaterial and a method for manufacturing the same, and more particularly, to a carbon nanomaterial for gas storage and a method for manufacturing the same.

Description of Related Art

There are many types of methods for hydrogen storage. In the past, the focus of research in hydrogen storage was mostly on hydrogen liquefaction to enhance energy density, and chemisorption with strong adsorbability was mostly the main driving force for hydrogen storage. The release step of hydrogen after storage often requires a high temperature environment as a driving force, thereby generating additional energy consumption.

Recently, the technology for hydrogen storage in activated carbons has been developed. Since activated carbon is light in weight and has a high hydrogen storage capacity per unit weight, it has become a hydrogen storage material that attracts attention from all walks of life. However, the current hydrogen storage capacity of commercial activated carbons still has room for improvement.

SUMMARY

The disclosure provides a carbon nanomaterial for gas storage, which has a good micropore size distribution and a large number of defect structures, and thus may have a high gas storage capacity and good cycle reversibility.

The disclosure also provides a method for manufacturing a carbon nanomaterial for gas storage, which may manufacture the above carbon nanomaterial for gas storage.

The carbon nanomaterial for gas storage in the disclosure is adapted to store gas. A specific surface area of the carbon nanomaterial for gas storage is greater than 2000 m$^2$/g. A mesopore volume of the carbon nanomaterial for gas storage is greater than a micropore volume of the carbon nanomaterial for gas storage. The carbon nanomaterial for gas storage has a peak intensity ratio ($I_D/I_G$) between G band and D band, as determined from the Raman spectrum, between 1.1 and 2. In the carbon nanomaterial for gas storage, a pore volume of pores with a pore width of 6 nm or less is bigger than a pore volume of pores with a pore width greater than 6 nm.

In an embodiment of the disclosure, the pore volume of the pores with the pore width of 6 nm or less is 1 cm$^3$/g or more.

In an embodiment of the disclosure, a total pore volume of the carbon nanomaterial for gas storage is greater than 1.5 cm$^3$/g.

In an embodiment of the disclosure, the micropore volume of the carbon nanomaterial for gas storage is greater than 0.3 cm$^3$/g.

In an embodiment of the disclosure, an XRD coherence length of a (002) crystal plane of the carbon nanomaterial for gas storage is less than 10 Å.

In an embodiment of the disclosure, a lattice spacing of the (002) crystal plane of the carbon nanomaterial for gas storage is greater than 1.1 Å.

In an embodiment of the disclosure, an average pore size of the carbon nanomaterial for gas storage is 3.8 nm or less.

In an embodiment of the disclosure, a hydrogen storage capacity of the carbon nanomaterial for gas storage at 40 bar and 77K is greater than 5.0 wt %.

The method for manufacturing the carbon nanomaterial for gas storage in the disclosure includes the following steps. A hydrothermal carbonization (HTC) method is used to prepare an activated carbon material. Then, the activated carbon material is mixed with hydroxide to perform a first high-temperature calcination, so as to obtain a carbon material that is preliminary activated. Next, the carbon material that is preliminarily activated is mixed with the hydroxide to perform a second high-temperature calcination, so as to to obtain the carbon nanomaterial for gas storage.

In another embodiment of the disclosure, the hydrothermal carbonization method includes the following steps. A precursor is prepared. The precursor is calcined under an inert atmosphere to obtain the activated carbon material.

In another embodiment of the disclosure, a weight ratio of the activated carbon material to the hydroxide is 1:2 to 1:4.

In another embodiment of the disclosure, a weight ratio of the carbon material that is preliminary activated to the hydroxide is 1:2 to 1:4.

In another embodiment of the disclosure, the first high-temperature calcination includes a first heating and a second heating, and a temperature of the second heating is different from a temperature of the first heating by 400° C. or more.

In another embodiment of the disclosure, the second high-temperature calcination includes the first heating and the second heating, and the temperature of the second heating is different from the temperature of the first heating by 400° C. or more.

Based on the above, in the disclosure, hydrothermal carbonization is used to synthesize the activated carbon material, and then the two high-temperature calcinations are used to make it into the carbon nanomaterial for gas storage. Such carbon nanomaterial presents a high level of gas storage capacity under low temperature and high pressure, that is, shows an excellent physical adsorption capacity. Therefore, it is adapted to store the gas.

In order for the aforementioned features and advantages of the disclosure to be more comprehensible, embodiments accompanied with drawings are described in detail below.

DETAILED DESCRIPTION OF DISCLOSED EMBODIMENTS

Figure 1A:
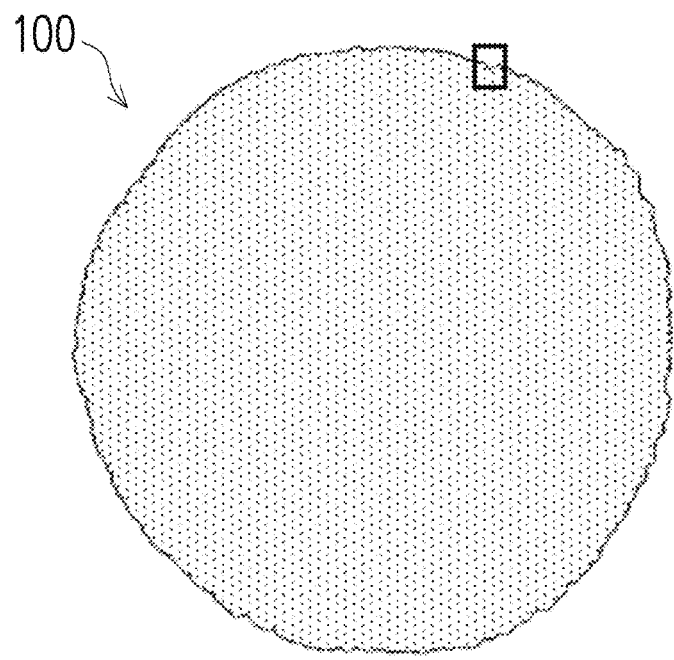
FIG. 1A is a schematic diagram of a carbon nanomaterial for gas storage according to an embodiment of the disclosure.

The exemplary embodiments of the disclosure will be fully described below with reference to the drawings, but the disclosure may also be implemented in many different forms and should not be construed as being limited to the embodiments described herein. In the drawings, for clarity, a relative size, a thickness, and a location of each region, portion, and/or layer may not be necessarily drawn to scale.

Figure 1B:
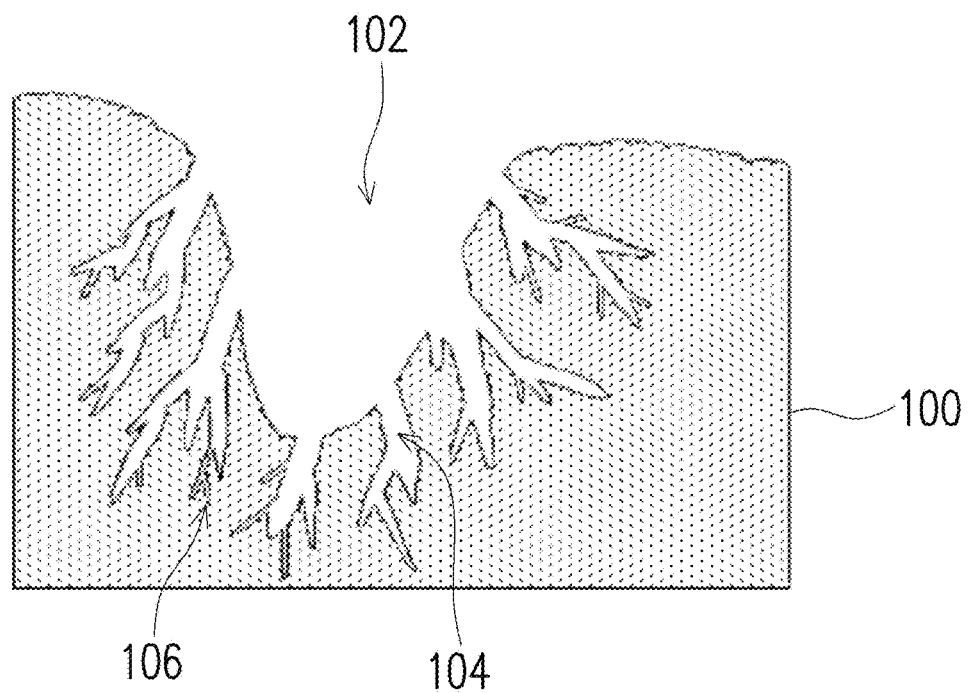
FIG. 1B is a schematic partial enlarged diagram of FIG. 1A.

FIG. 1A is a schematic diagram of a carbon nanomaterial for gas storage according to an embodiment of the disclosure. FIG. 1B is a schematic partial enlarged diagram (which is a frame part) of FIG. 1A.

Referring to FIGS. 1A and 1B, it is experimentally verified that a carbon nanomaterial 100 for gas storage in this embodiment has a specific surface area greater than 2000 m$^2$/g, and a mesopore volume of the carbon nanomaterial 100 for gas storage is greater than a micropore volume of the carbon nanomaterial 100 for gas storage. A pore size of activated carbon is generally defined as a macropore 102 which is a pore with a pore width greater than 50 nm, a mesopore 104 which is a pore with a pore width between 2 nm and 50 nm, and a micropore 106 which is a pore with a pore width less than 2 nm. In addition, the carbon nanomaterial 100 for gas storage has a peak intensity ratio ($I_D/I_G$) between G band and D band, as determined form the Raman spectrum, between 1.1 and 2. Since $I_D$ denotes disorder on activated carbon, and $I_G$ denotes a degree of order, the greater $I_D/I_G$ is, the more obvious defects and more defects the activated carbon has. In addition, it is experimentally verified that in the carbon nanomaterial 100 for gas storage in this embodiment, a pore volume of pores with a pore width of 6 nm or less is bigger than that of pores with a pore width greater than 6 nm. Therefore, the carbon nanomaterial 100 for gas storage in the embodiment has more micropores and pores close to a lower limit of the mesopore, which is conducive to gas storage. For example, the pore volume of the pores with the pore width of 6 nm or less of the carbon nanomaterial 100 for gas storage may be 1 cm$^3$/g or more. The gas may be hydrogen gas, nitrogen gas, or the like. In an embodiment, a total pore volume of the carbon nanomaterial 100 for gas storage is greater than 1.5 cm$^3$/g. The micropore volume of the carbon nanomaterial 100 for gas storage is greater than 0.3 cm$^3$/g. An average pore size of the carbon nanomaterial 100 for gas storage is 3.8 nm or less.

From the viewpoint of easy hydrogen storage, an XRD coherence length of a (002) crystal plane of the carbon nanomaterial 100 for gas storage in this embodiment is preferably less than 10 Å. The coherence length is related to the long-range degree of order of a carbon material, and according to an XRD analysis, a (002) peak has a relatively obvious size change, reflecting that a crystal lattice here is stretched, or a bond is destroyed. Therefore, the smaller the XRD coherence length of the (002) crystal plane is, the more defects in the carbon material there are, and a large number of defects are conducive to gas storage. In particular, the hydrogen gas may be stored on the (002) crystal plane that is stretched or destroyed. As for the carbon nanomaterial 100 for gas storage, a lattice spacing of the (002) crystal plane is, for example, greater than 1.1 Å. In an embodiment, a hydrogen storage capacity of the carbon nanomaterial 100 for gas storage at 40 bar and 77K is greater than 5.0 wt %.

Figure 2:
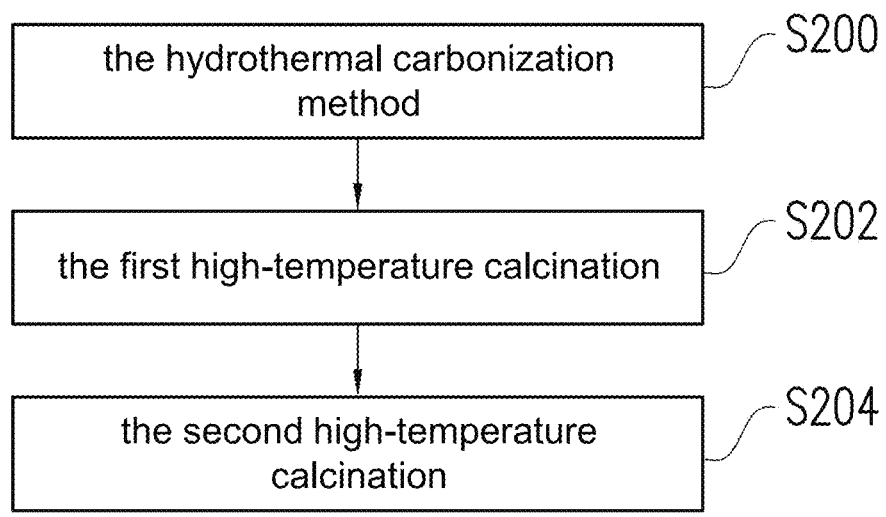
FIG. 2 is a flowchart of steps for preparing a carbon nanomaterial for gas storage according to another embodiment of the disclosure.
Figure 3:
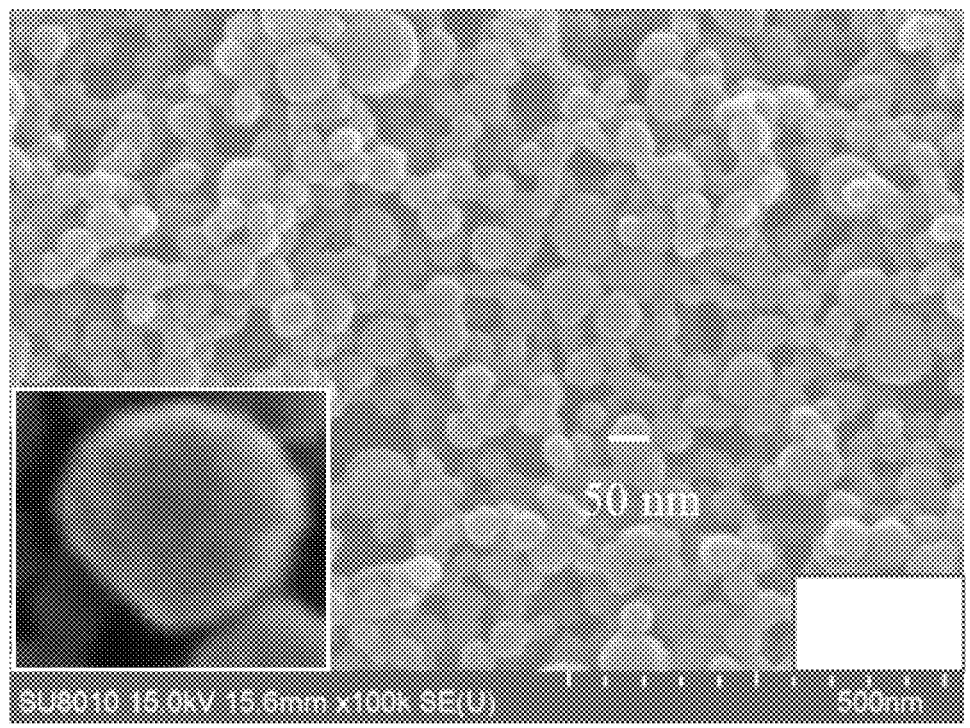
FIG. 3 is an SEM image of Preparation Example 3.

FIG. 2 is a flowchart of steps for preparing a carbon nanomaterial for gas storage according to another embodiment of the disclosure.

Referring to FIG. 2, a method for manufacturing the carbon nanomaterial for gas storage in this embodiment includes the following. First, in step S200, a hydrothermal carbonization (HTC) method is performed to prepare an activated carbon material. The hydrothermal carbonization method includes that a precursor is prepared, and the precursor is calcined under an inert atmosphere to obtain the activated carbon material. A hydrothermal temperature is, for example, 200° C. to 300° C., and time is, for example, 8 hours to 12 hours. The precursor may be an organic raw material such as sugar or starch.

Then, in step S202, the activated carbon material is mixed with hydroxide to perform a first high-temperature calcination, so as to obtain the carbon material that is preliminarily activated. The hydroxide is, for example, potassium hydroxide (KOH) and sodium hydroxide (NaOH), etc. A weight ratio of the activated carbon material to the hydroxide (such as KOH) may be 1:2 to 1:4, for example, 1:2, 1:3, or 1:4. The first high-temperature calcination may include a first heating and a second heating. A temperature of the second heating and a temperature of the first heating may differ by 400° C. or more, for example, a difference of 400° C., a difference of 450° C., or a difference of 500° C.

Next, in step S204, the carbon material that is preliminarily activated obtained in step S202 is mixed with the hydroxide to perform a second high-temperature calcination, so as to obtain the carbon nanomaterial for gas storage. The hydroxide is, for example, potassium hydroxide and sodium hydroxide, etc. A weight ratio of the carbon material that is preliminarily activated to the hydroxide may be 1:2 to 1:4, for example, 1:2, 1:3, or 1:4. The second high-temperature calcination may also include the first heating and the second heating. The temperature of the second heating and the temperature of the first heating may differ by 400° C. or more, for example, the difference of 400° C., the difference of 450° C., or the difference of 500° C.

Hereinafter, experiments are listed to verify the efficacy of the disclosure, but the disclosure is not limited to the following content.

Preparation Example 1

1. Hydrothermal Carbonization Method

Kayexalate (0.154 g) and glucose (7.7 g) are dissolved in deionized water of 38.4 ml, and then heated to 220° C. at 5° C./min. After holding the temperature for 8 hours, it is taken out after naturally cooled to a room temperature.

A product is taken out and placed in a centrifuge tube, and washed back and forth with the deionized water and industrial alcohol of 95%. Finally, a supernatant is taken out and placed in an oven to dry overnight in a constant temperature at 80° C.

The above dry powder is placed in a nickel crucible, and placed in a high-temperature furnace tube. The dry powder is calcined in a nitrogen-filled environment. A heating process thereof is set to 5° C./min to be heated to 800° C., and after holding the temperature in an environment of 800° C. for 2 hours, the dry powder is naturally cooled to the room temperature (in which a nitrogen flow rate is 500 cc/min).

The calcined product is black powder, and the deionized water and the industrial alcohol of 95% are alternately used to perform centrifugal cleaning. After baking, the activated carbon material is obtained.

2. First High-Temperature Calcination

The activated carbon material is put into potassium hydroxide (KOH) in the weight ratio of 1:2 for uniform mixing, and placed in the high-temperature furnace tube. The high-temperature calcination is performed in the nitrogen-filled environment, and the heating process is set to two heating. The first heating is from 5° C./min to 350° C., and then the temperature is held at 350° C. for 3 minutes. Then, the second heating is performed at 5° C./min to 800° C., and the temperature is held at 800° C. for 2 hours and naturally cooled to the room temperature after the second heating is finished (in which the nitrogen flow rate is 500 cc/min).

1M HCl (aq) is used to neutralize the carbon material that is preliminary activated obtained in the previous step, and the deionized water and the industrial alcohol of 95% are alternately used to perform centrifugal cleaning and drying.

3. Second High-Temperature Calcination

The carbon material that is preliminary activated is put into KOH in the weight ratio of 1:2 for uniform mixing, and placed in the high-temperature furnace tube. The high-temperature calcination is performed in the nitrogen-filled environment, and the heating process is set to two heating. The first heating is from 5° C./min to 350° C., and then the temperature is held at 350° C. for 3 minutes. Then, the second heating is performed at 5° C./min to 800° C., and the temperature is held at 800° C. for 2 hours and naturally cooled to the room temperature after the second heating is finished (in which the nitrogen flow rate is 500 cc/min).

1M HCl (aq) is used to neutralize the carbon nanomaterial for gas storage obtained in the previous step, and the deionized water and the industrial alcohol of 95% are alternately used to perform centrifugal cleaning and drying.

Preparation Example 2

The carbon nanomaterial for gas storage is manufactured in same steps as Preparation Example 1. However, in the second high-temperature calcination, the carbon material that is preliminary activated and the hydroxide are mixed in the weight ratio of 1:4.

Preparation Example 3

The carbon nanomaterial for gas storage is manufactured in same steps as Preparation Example 2. However, in the first high-temperature calcination, the activated carbon material and the hydroxide are mixed in the weight ratio of 1:4.

Comparative Example 1

The carbon nanomaterial for gas storage is manufactured in same steps as Preparation Example 1, but the second high-temperature calcination is not performed.

Comparative Example 2

A commercial carbon material XC-72 (which is the model UR-XC72 from UniRegion Bio-Tech) is used.

Comparative Example 3

Graphite is used as a carbon material of Comparative Example 3.

<XRD Analysis>

First, XRD is used to analyze Preparation Examples 1 to 3 and Comparative Examples 2 to 3, and results thereof are shown in Table 1 below.

TABLE 1

| Sample | Lattice | |
|---|---|---|
| | (002) Coherence length (Å) | (002) Lattice spacing (Å) |
| Preparation Example 1 | 4.98 | 1.74 |
| Preparation Example 2 | 8.96 | 1.78 |
| Preparation Example 3 | 4.79 | 1.93 |
| Comparative example 2 | 12.96 | 2.04 |
| Comparative example 3 | 113.37 | 1.51 |

The coherence length in Table 1 denotes the long-range degree of order of crystals. The greater the value is, the fewer the crystal defects there are. On the contrary, the less the value is, the more the crystal defects there are. The coherence length may be derived from the Scherrer equation. The lattice spacing may be derived from the Bragg's law.

It may be seen from Table 1 that the graphite of Comparative Example 3 has a coherence length of more than 100 Å, while coherence lengths of Preparation Examples 1 to 3 are all less than 5 Å. Such a difference is due to the two high-temperature calcinations activated by KOH in the manufacturing processes of Preparation Examples 1 to 3. Since a high concentration of OH enters (002), causing the layers in this direction to be stretched or the bond is broken, the long-range degree of order is significantly reduced, and the effective defects appear in samples of Preparation Examples 1 to 3. Except for the (002) crystal plane, the lattice spacing of other crystal planes is experimentally tested to be smaller than one H atom, so that it is impossible to allow H to enter.

<Analysis of Raman Spectra>

Figure 4:
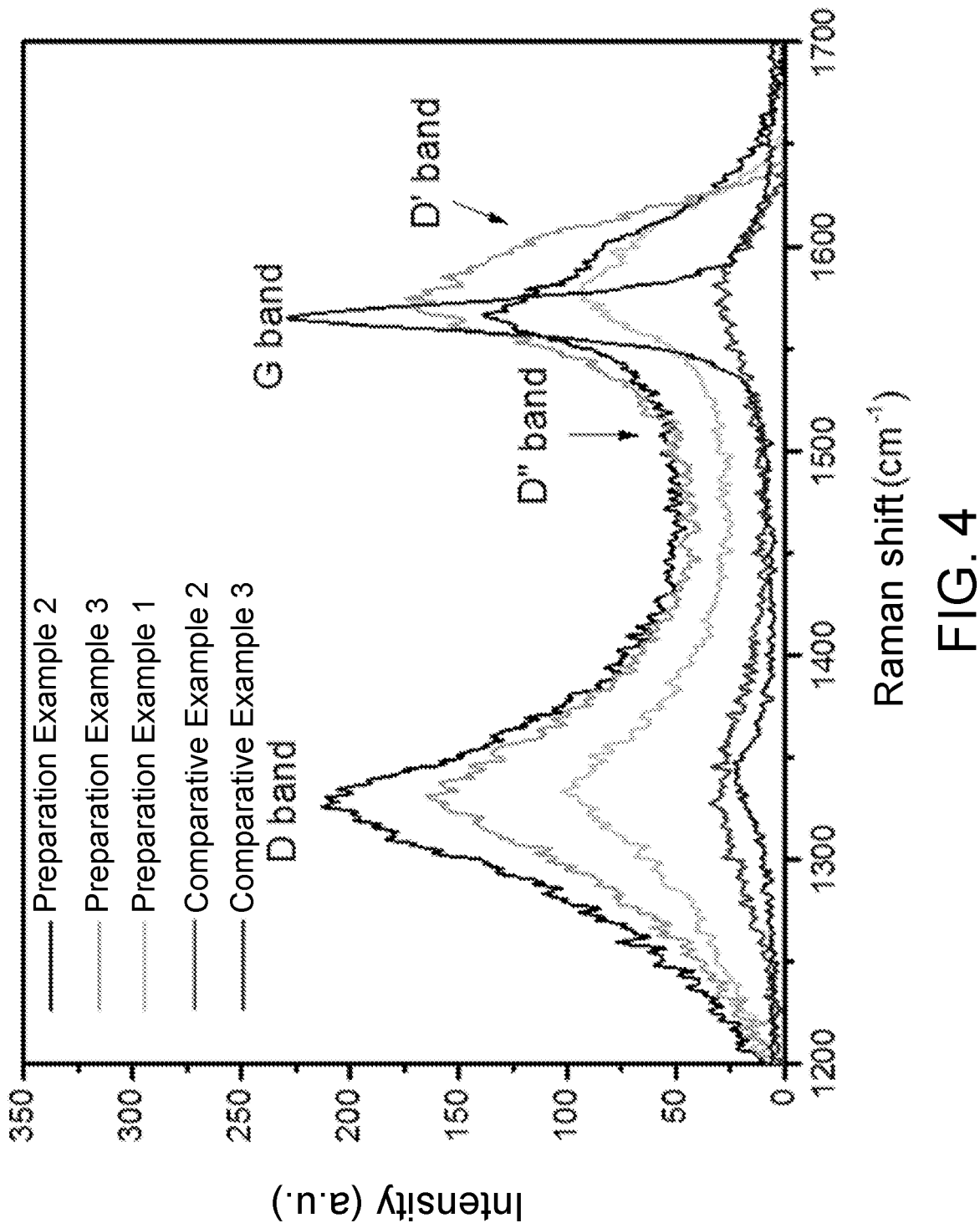
FIG. 4 is Raman spectra of Preparation Examples 1 to 3 and Comparative Examples 2 to 3.

In order to further verify that there are more defects that are conducive to gas storage in Preparation Examples 1 to 3, an analysis of Raman spectra is performed on Preparation Examples 1 to 3 and Comparative Examples 2 to 3, and results thereof are shown in FIG. 4.

From FIG. 4, the G band generated by graphite and the sp2 bonding in graphene at 1580 cm$^{-1}$ and the D band generated by the defect and amorphous carbon at 1350 cm$^{-1}$ may be obtained. The peak intensity ratio ($I_D/I_G$) between the G band and the D band is a defect ratio, and the greater the defect ratio is, the more defects the material has. At about 1600 to 1620 cm$^{-1}$, D' band appears. When the D' band appears in high-concentration defects, it is generated through phonon vibration, causing the G band to generate a side peak. D" band connects the G band and the D band, and the D" band is also a peak that appears under a high defect structure. Therefore, by converting the peak intensity in FIG. 4 into $I_D/I_G$ to be recorded in Table 2 below, a result that $I_D/I_G$ of Preparation Examples 1 to 3 are much greater than that of Comparative Example 3 may be obtained.

TABLE 2

|  | Preparation Example 1 | Preparation Example 2 | Preparation Example 3 | Comparative example 2 | Comparative example 3 |
|---|---|---|---|---|---|
| $I_D/I_G$ | 1.14 | 1.77 | 1.12 | 1.09 | 0.08 |

In addition, $I_D/I_G$ of the commercial carbon material XC-72 of Comparative Example 2 is close to $I_D/I_G$ of Preparation Examples 1 to 3. However, not as long as there is a defect, it may have a good gas adsorption capacity. Regarding the gas adsorption capacity, it is necessary to use BET analysis to discuss pore distribution in the carbon material.

<BET Analysis>

Figure 5:
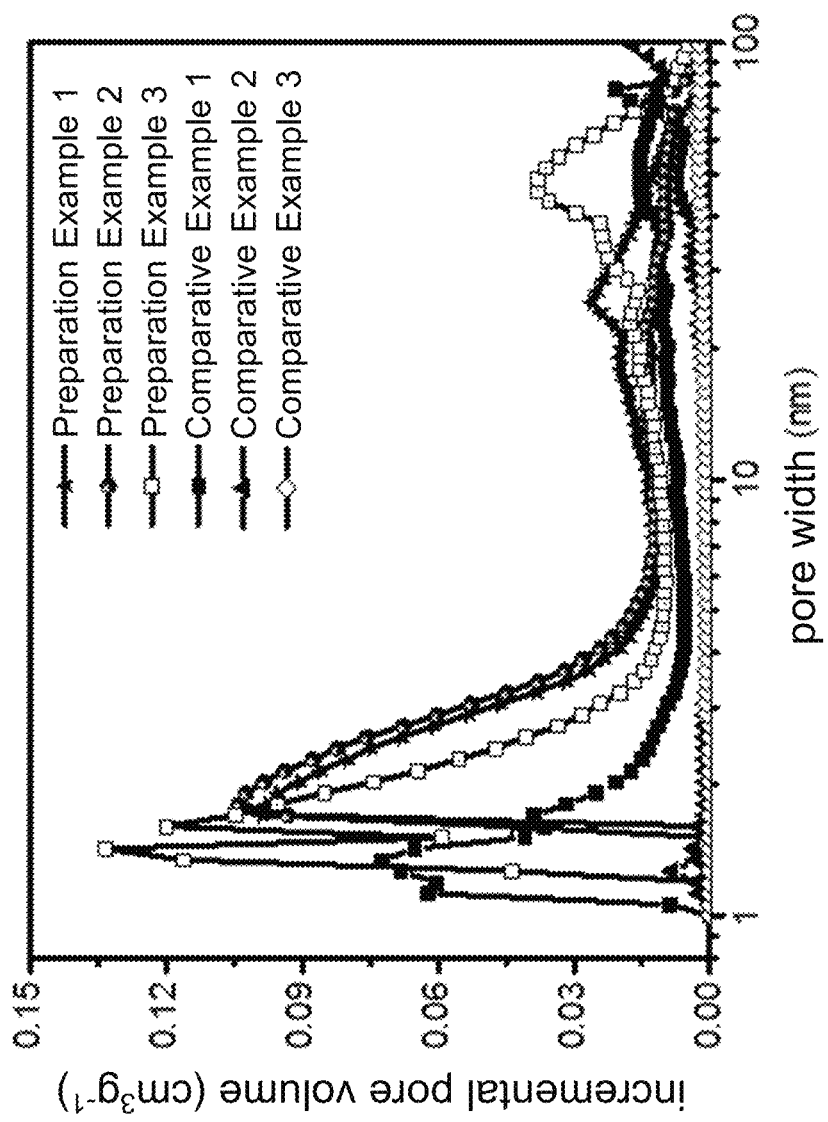
FIG. 5 is a distribution diagram of pore widths of Preparation Examples 1 to 3 and Comparative Examples 1 to 3 by a BET analysis.

BET is used to analyze Preparation Examples 1 to 3 and Comparative Examples 1 to 3, and results thereof are shown in FIG. 5. It may be seen from FIG. 5 that the carbon nanomaterials of Preparation Examples 1 to 3 have the large amount of pore volume with the pore width of 6 nm or less. In Preparation Example 1A, the pore volume with the pore width of 6 nm or less is 1.12463 cm$^3$/g. In Preparation Example 2, the pore volume with the pore width of 6 nm or less is 1.18617 cm$^3$/g. In Preparation Example 3, the pore volume with the pore width of 6 nm or less is 1.26269 cm$^3$/g. The micropores and the pores close to the lower limit of the mesopore help the hydrogen gas to be adsorbed on the material smoothly under high pressure. On the contrary, in Comparative Examples 2 to 3, the amount of pore volume with the pore width of 6 nm or less is extremely low. In Comparative Example 1, the pore volume with the pore width of 6 nm or less is only 0.68777 cm$^3$/g. In Comparative Example 2, the pore volume with the pore width of 6 nm or less is only 0.035486 cm$^3$/g. In Comparative Example 3, the pore volume with the pore width of 6 nm or less is only 0.007587 cm$^3$/g. In other words, the amount of pore volume with the pore width of 6 nm or less in Comparative Example 1 is only half of the amount of pore volume with the pore width of 6 nm or less in Preparation Example 3. Therefore, the carbon nanomaterials in Preparation Examples 1 to 3 are conducive to gas adsorption.

In addition, the specific surface areas and the values related to the pore volume in Table 3 below may further be obtained from the BET analysis.

TABLE 3

|  | Specific surface area (m$^2$/g) | Total pore volume (cm$^3$/g) | Average pore size (nm) | Micropore volume (cm$^3$/g) | Mesopore volume (cm$^3$/g) | Volume ratio of micropore to mesopore (%) |
|---|---|---|---|---|---|---|
| Preparation Example 1 | 2137 | 1.80 | 3.44 | 0.4257 | 1.314 | 32.4 |
| Preparation Example 2 | 2291 | 2.03 | 3.55 | 0.3977 | 1.2262 | 32.4 |
| Preparation Example 3 | 2584 | 2.09 | 3.51 | 0.8313 | 1.0437 | 79.6 |
| Comparative example 1 | 1424.9 | 1.17 | 3.9 | 0.5306 | 0.4976 | 106.6 |
| Comparative example 2 | 215.2 | 0.41 | 13.03 | 0.0275 | 0.0740 | 37.1 |
| Comparative example 3 | 20.5 | 0.09 | 19.30 | 0 | 0.0513 | 0 |

It may be seen from Table 3 that the number of micropores of Preparation Examples 1 to 3 is much greater than that of the commercial carbon materials of Comparative Examples 2 to 3. Not only that, the specific surface areas of Preparation Examples 1 to 3 are extremely high, which means that there are more adsorption sites for gas adsorption. In addition, although the number of micropores of Comparative Example 1 is similar to the number of micropores of Preparation Examples 1 to 3, there is a difference in a volume ratio of the micropore to the mesopore. In other words, the number of micropores of Comparative Example 1 is much greater than the number of mesopores thereof, which indicates that the carbon material of Comparative Example 1 has fewer mesopores. Once the number of mesopores is low, it means that there are fewer pipelines for the hydrogen gas to enter the micropore, thereby reducing the hydrogen storage capacity.

Figure 6:
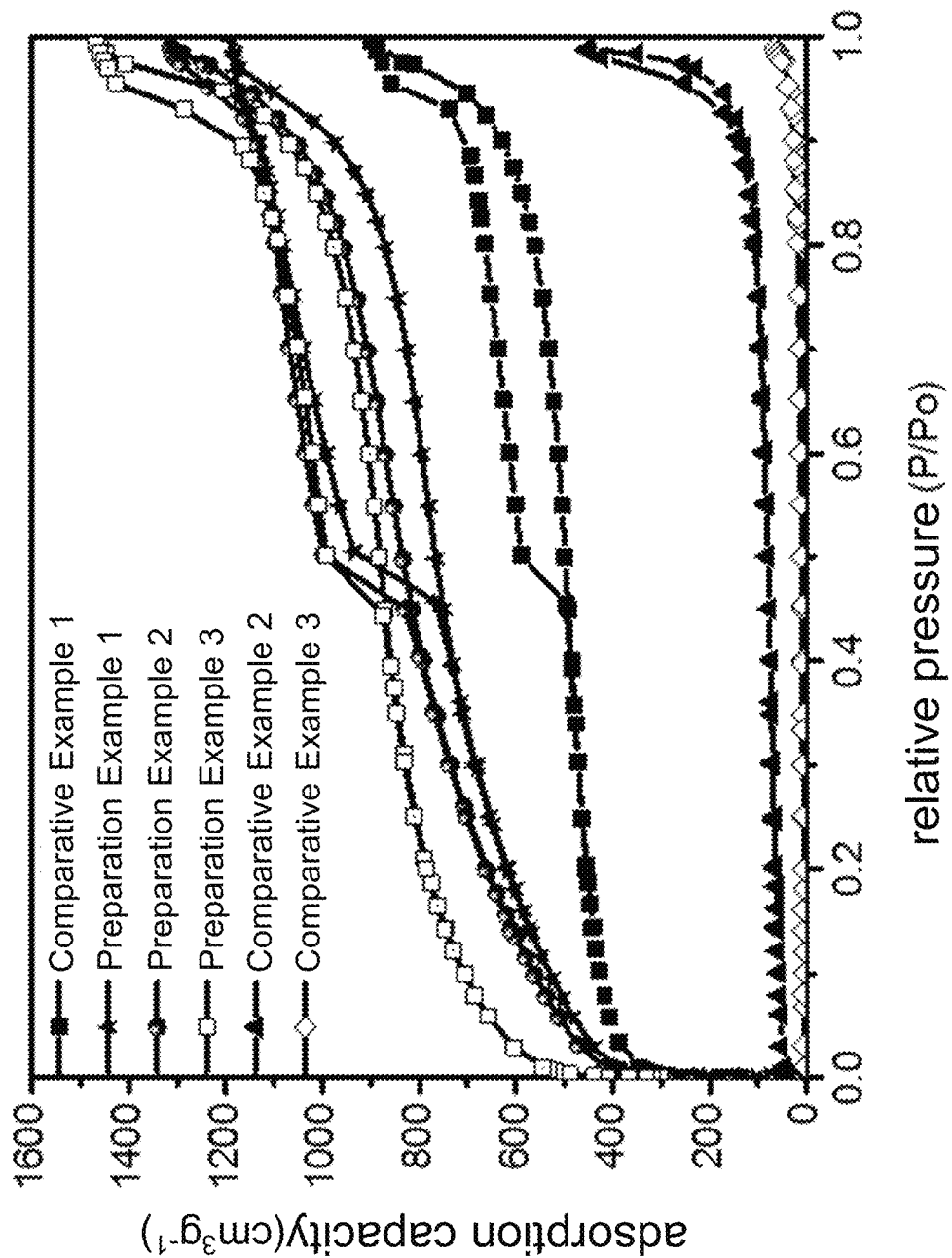
FIG. 6 is a graph of adsorption isotherm of Preparation Examples 1 to 3 and Comparative Examples 1 to 3 by a BET analysis.

It may also be seen from a graph of BET adsorption isotherm in FIG. 6 that an area under curves of Preparation Examples 1 to 3 is extremely large, which indicates that the sample has a very high adsorption capacity. Adsorption capacities of Comparative Examples 1 to 3 are much smaller than those of Preparation Examples 1 to 3.

⟨Measurement of Hydrogen Storage Capacity⟩

The HPVA-II high pressure volumetric analyzer is used to measure the hydrogen storage capacity. The hydrogen storage capacities of Preparation Example 2, Comparative Example 2, and Comparative Example 3 that varies with pressure are shown in FIG. 7.

Figure 7:
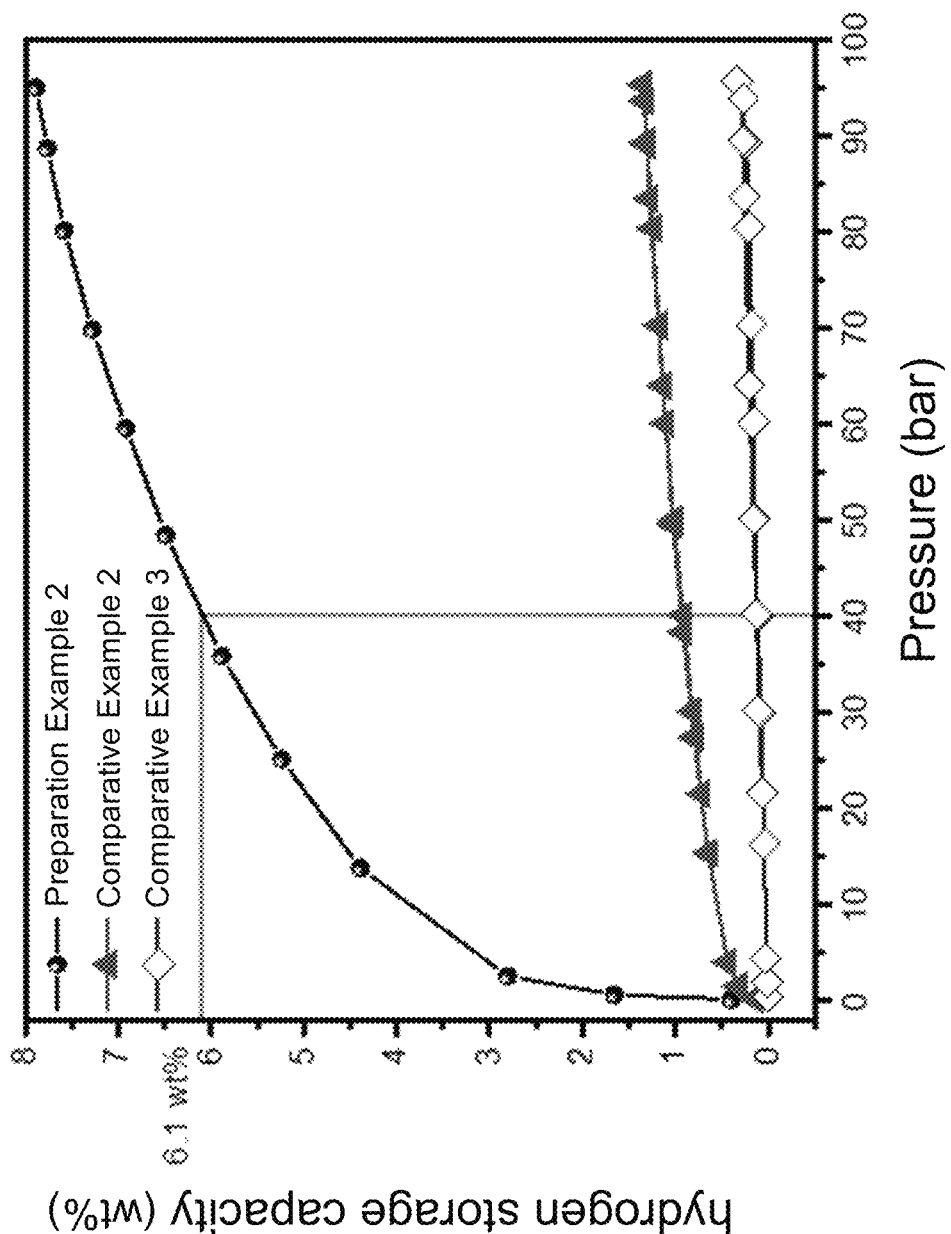
FIG. 7 is a graph of hydrogen storage capacities of Preparation Example 2, Comparative Example 2, and Comparative Example 3.

It may be seen from FIG. 7 that the carbon nanomaterial of Preparation Example 2 has an excellent gas storage capacity of about 6.1 wt % at a temperature of 77K and a stress of 40 Bar.

Figure 8:
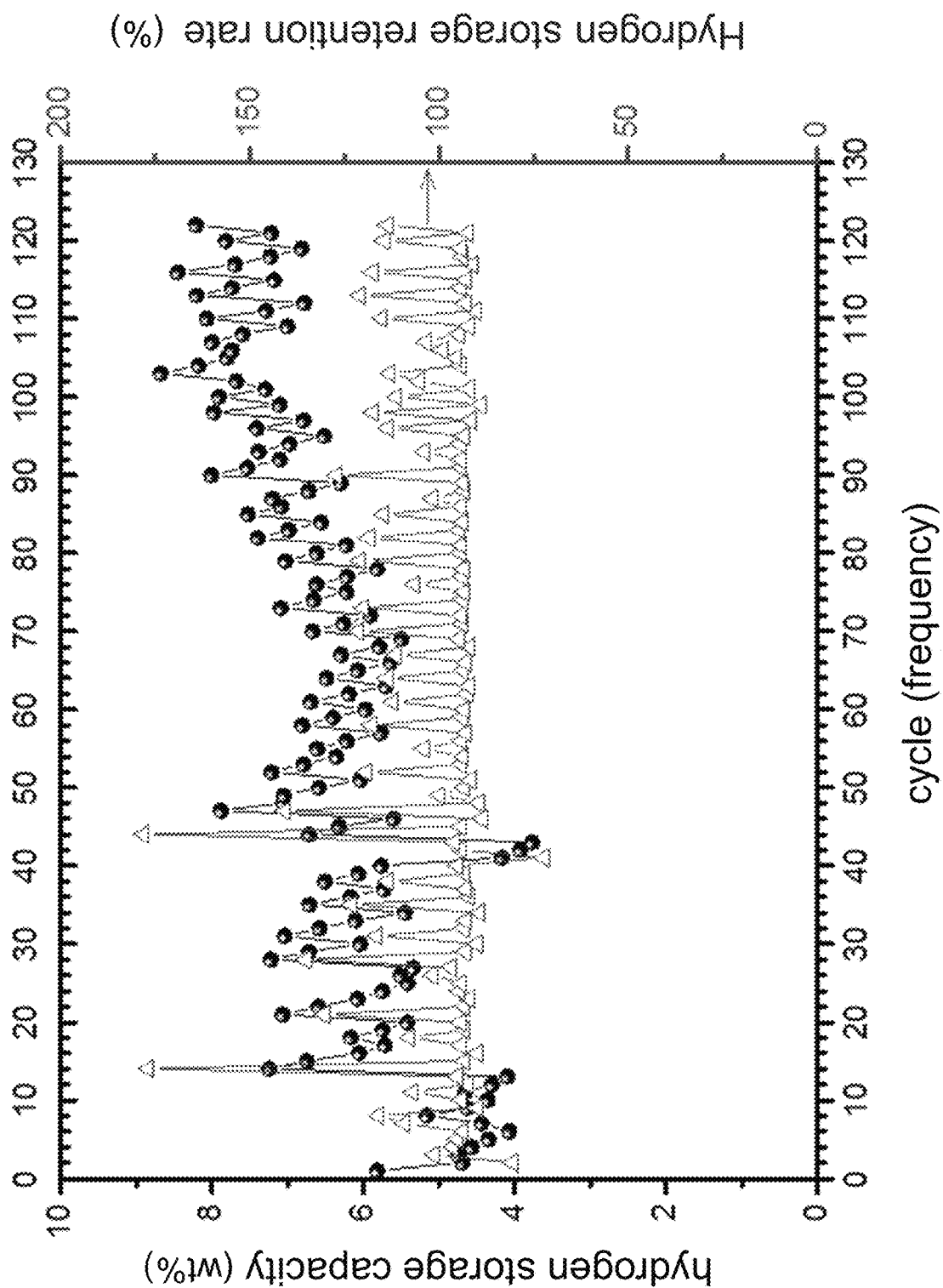
FIG. 8 is a graph of a cycle test on the hydrogen storage capacity of Preparation Example 2.

In addition, a cycle test on the hydrogen storage capacity is performed on the carbon nanomaterial of Preparation Example 2, and thus FIG. 8 is obtained.

It may be seen from FIG. 8 that the carbon nanomaterial of Preparation Example 2 still has good reversibility after 120 cycles of testing.

Based on the above, the carbon nanomaterial for gas storage in the disclosure has the specific pore distribution and the relatively great specific surface area. Therefore, it is suitable for gas storage. In particular, the carbon nanomaterial for gas storage in the disclosure has the large number of defects. Such a feature helps the carbon material to store and release gas under low temperature and high pressure by physical adsorption, and its reversibility may be known through more than 100 repetitive tests.

Although the disclosure has been described with reference to the above embodiments, they are not intended to limit the disclosure. It will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. A carbon nanomaterial for gas storage to store gas, wherein a specific surface area of the carbon nanomaterial for gas storage is greater than 2000 m²/g, a mesopore volume of the carbon nanomaterial for gas storage is greater than a micropore volume of the carbon nanomaterial for gas storage, the carbon nanomaterial for gas storage has a peak intensity ratio ($I_D/I_G$) between G band and D band, as determined from the Raman spectrum, between 1.1 and 2, and in the carbon nanomaterial for gas storage, a pore volume of pores with a pore width of 6 nm or less is bigger than a pore volume of pores with a pore width greater than 6 nm.

2. The carbon nanomaterial for gas storage according to claim 1, wherein the pore volume of the pores with the pore width of 6 nm or less of the carbon nanomaterial for gas storage is 1 cm³/g or more.

3. The carbon nanomaterial for gas storage according to claim 1, wherein a total pore volume of the carbon nanomaterial for gas storage is greater than 1.5 cm³/g.

4. The carbon nanomaterial for gas storage according to claim 1, wherein the micropore volume of the carbon nanomaterial for gas storage is greater than 0.3 cm³/g.

5. The carbon nanomaterial for gas storage according to claim 1, wherein an XRD coherence length of a (002) crystal plane of the carbon nanomaterial for gas storage is less than 10 Å.

6. The carbon nanomaterial for gas storage according to claim 1, wherein a lattice spacing of a (002) crystal plane of the carbon nanomaterial for gas storage is greater than 1.1 Å.

7. The carbon nanomaterial for gas storage according to claim 1, wherein an average pore size of the carbon nanomaterial for gas storage is 3.8 nm or less.

8. The carbon nanomaterial for gas storage according to claim 1, wherein a hydrogen storage capacity of the carbon nanomaterial for gas storage at 40 bar and 77K is greater than 5.0 wt %.

9. A method for manufacturing the carbon nanomaterial for gas storage according to claim 1, comprising:
   using a hydrothermal carbonization (HTC) method to prepare an activated carbon material;
   mixing the activated carbon material with hydroxide to perform a first high-temperature calcination to obtain a carbon material that is preliminary activated; and
   mixing the carbon material that is preliminarily activated with the hydroxide to perform a second high-temperature calcination to obtain the carbon nanomaterial for gas storage.

10. The method according to claim 9, wherein the hydrothermal carbonization method comprises:
    preparing a precursor; and
    calcining the precursor under an inert atmosphere to obtain the activated carbon material.

11. The method according to claim 9, wherein a weight ratio of the activated carbon material to the hydroxide is 1:2 to 1:4.

12. The method according to claim 9, wherein a weight ratio of the carbon material that is preliminary activated to the hydroxide is 1:2 to 1:4.

13. The method according to claim 9, wherein the first high-temperature calcination and the second high-temperature calcination each comprise a first heating and a second heating, and a temperature of the second heating is different from a temperature of the first heating by 400° C. or more.

14. The method according to claim 9, wherein the pore volume of the pores with the pore width of 6 nm or less is 1 cm³/g or more.

15. The method according to claim 9, wherein a total pore volume of the carbon nanomaterial for gas storage is greater than 1.5 cm³/g.

16. The method according to claim 9, wherein a micropore volume of the carbon nanomaterial for gas storage is greater than 0.3 cm³/g.

17. The method according to claim 9, wherein an XRD coherence length of a (002) crystal plane of the carbon nanomaterial for gas storage is less than 10 Å.

18. The method according to claim 9, wherein a lattice spacing of a (002) crystal plane of the carbon nanomaterial for gas storage is greater than 1.1 Å.

19. The method according to claim 9, wherein an average pore size of the carbon nanomaterial for gas storage is 3.8 nm or less.

20. The method according to claim 9, wherein a hydrogen storage capacity of the carbon nanomaterial for gas storage at 40 bar and 77K is greater than 5.0 wt %.

* * * * *